United States Patent [19]

Pape

[11] Patent Number: 4,829,585
[45] Date of Patent: May 9, 1989

[54] ELECTRONIC IMAGE PROCESSING CIRCUIT

[75] Inventor: David D. Pape, Framingham, Mass.

[73] Assignee: Polaroid Corporation, Cambridge, Mass.

[21] Appl. No.: 45,400

[22] Filed: May 4, 1987

[51] Int. Cl.⁴ .............................................. G06K 9/36
[52] U.S. Cl. ...................... 382/41; 364/757; 382/49
[58] Field of Search ................... 382/41, 49; 364/757, 364/754, 758, 759, 760

[56] References Cited

U.S. PATENT DOCUMENTS

| | | | |
|---|---|---|---|
| 4,086,474 | 4/1978 | Negi et al. | 364/757 |
| 4,484,349 | 11/1984 | McCubbrey | 382/49 |
| 4,546,446 | 10/1985 | Machida | 364/757 |
| 4,550,437 | 10/1985 | Kobayashi et al. | 382/41 |
| 4,573,136 | 2/1986 | Rossiter | 364/757 |
| 4,589,085 | 5/1986 | Pierce | 364/754 |
| 4,635,292 | 1/1987 | Mori et al. | 382/49 |
| 4,644,488 | 2/1987 | Nathan | 382/49 |
| 4,718,091 | 1/1988 | Kobayashi et al. | 382/41 |
| 4,731,864 | 3/1988 | Modla | 382/41 |

*Primary Examiner*—Leo H. Boudreau
*Assistant Examiner*—Joseph Mancuso
*Attorney, Agent, or Firm*—Edward S. Roman

[57] ABSTRACT

An apparatus and method for high speed parallel processing of image data corresponding to picture elements of an image in which the image data for each picture element is formatted as a binary word for multiplication by a plurality of different coefficients also in binary format. Parallel processing is accomplished by a plurality of multiplication circuits each of which stores select coefficients and receives binary formatted image data words simultaneously in timed sequence from the least significant data bit to the most significant data bit.

9 Claims, 4 Drawing Sheets

| | $C_1$ | $C_2$ | $C_3$ | $C_4$ | $C_5$ | $C_6$ | $C_7$ | $C_8$ | $C_9$ | |
|---|---|---|---|---|---|---|---|---|---|---|
| MULTIPLIER PIXEL IMAGE DATA | | | 1 | 1 | 1 | 0 | | | | $R_1$ |
| MULTIPLICAND COEFF. DATA | | | 1 | 1 | 0 | 1 | | | | $R_2$ |
| $A_1$ | | | 0 | 0 | 0 | 0 | | | | $R_3$ |
| $B_1$ | | | 0 | 0 | 0 | 0 | | | | $R_4$ |
| $C_1$ | | | | 0 | 0 | 0 | 0 | | | $R_5$ |
| $A_2$ | | | 1 | 1 | 0 | 1 | | | | $R_6$ |
| $B_2$ | | | 1 | 1 | 0 | 1 | | | | $R_7$ |
| $C_2$ | | | | 1 | 1 | 0 | 1 | | | $R_8$ |
| $A_3$ | | | 1 | 1 | 0 | 1 | | | | $R_9$ |
| $B_3$ | | 1 | 0 | 0 | 1 | 1 | 1 | | | $R_{10}$ |
| $C_3$ | | | 1 | 0 | 0 | 1 | 1 | 1 | | $R_{11}$ |
| $A_4$ | | | 1 | 1 | 0 | 1 | | | | $R_{12}$ |
| $B_4$ | | 1 | 0 | 1 | 1 | 0 | 1 | 1 | | $R_{13}$ |
| $C_4$ | | | 1 | 0 | 1 | 1 | 0 | 1 | 1 | $R_{14}$ |

FIG 3

ELECTRONIC IMAGE PROCESSING CIRCUIT

BACKGROUND OF THE INVENTION

1. Field of the Invention

This invention relates generally to an apparatus and method for processing electronic image data and, more particularly, to an apparatus and method for high speed parallel processing of electronic image data using shift and add circuitry.

2. Description of the Prior Art

Electronic image processing requires that a large number of arithmetic operations be conducted on a large amount of image data in a relatively short period of time. Digitizing an electronic imaging system results in a substantial increase in the volume of image data and the complexity of arithmetic operations to be formed on such digital image data. For example, a two-dimensional image comprises hundreds of thousands of individual picture elements or pixels each of which in a digital electronic imaging processing system is represented by a binary formatted image data word. Each such digital image data word in itself comprises a plurality of binary data bits thereby further increasing the volume of electronic image data to be processed.

High speed image processors such as that disclosed in U.S. Pat. No. 4,550,437 to Kobayashi et al. entitled "Apparatus for Parallel Processing of Local Image Data", issued Oct. 29, 1985 are known in the art. This image processor relies on a high speed full parallel multiplier to accomplish a multiply and add operation in a requisite time frame. Unfortunately, the circuitry for a full parallel multiplier occupies an inordinately wide area of silicon thereby making the production of such silicon circuits quite expensive even with the advent of very large scale integrated (VLSI) technology. Moreover, this full parallel multiply technique requires that the image data being processed be recalled and stored in a memory many times during processing. Thus, even if the full parallel multiply operation is performed at a very high speed, the time required for each access of the image data by the processor nevertheless limits the overall process speed of this type of circuit. The difficulty resides in the fact that the image data simply cannot be recalled the requisite number of times fast enough from memory to be timely processed.

Therefore, it is the primary object of this invention to provide an image processing circuit for providing multiple arithmetic operations on binary formatted image data words corresponding to select picture elements of an image.

It is a further object of this invention to provide an image processing circuit for simultaneously multiplying binary formatted image data words corresponding to select picture elements of an image by a plurality of different binary formatted coefficients in a timely and efficient manner without storing and recalling image data words from memory during the multiplication.

SUMMARY OF THE INVENTION

An image processing circuit is provided for simultaneously multiplying in sequence each of a plurality of binary formatted image data words corresponding, respectively, to select picture elements of an image by a plurality of different binary formatted coefficients. The image processing circuit comprises a plurality of multiplier circuits connected in parallel relation with respect to each other. Each of the multiplier circuits, in turn, comprises means for storing at least one different binary formatted coefficient. Each of the multiplier circuits also includes means for multiplying each bit of a select binary formatted image data word in sequence from the least significant bit to the most significant bit by a select one of the coefficients to provide a binary formatted output signal corresponding to the multiplication of the image data word by the coefficient. Data shifting means operates to provide the select image data word simultaneously to all the multiplier circuits in timed sequence from the least significant data bit to the most significant data bit. Each of the multiplier circuits also includes means for latching the binary formatted output signals therefrom.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings:

FIG. 3 is a tabulation of binary numbers illustrating a sequence of operations of the image processing circuit of FIG. 1.

DESCRIPTION OF THE PREFERRED EMBODIMENT

Figure 1:
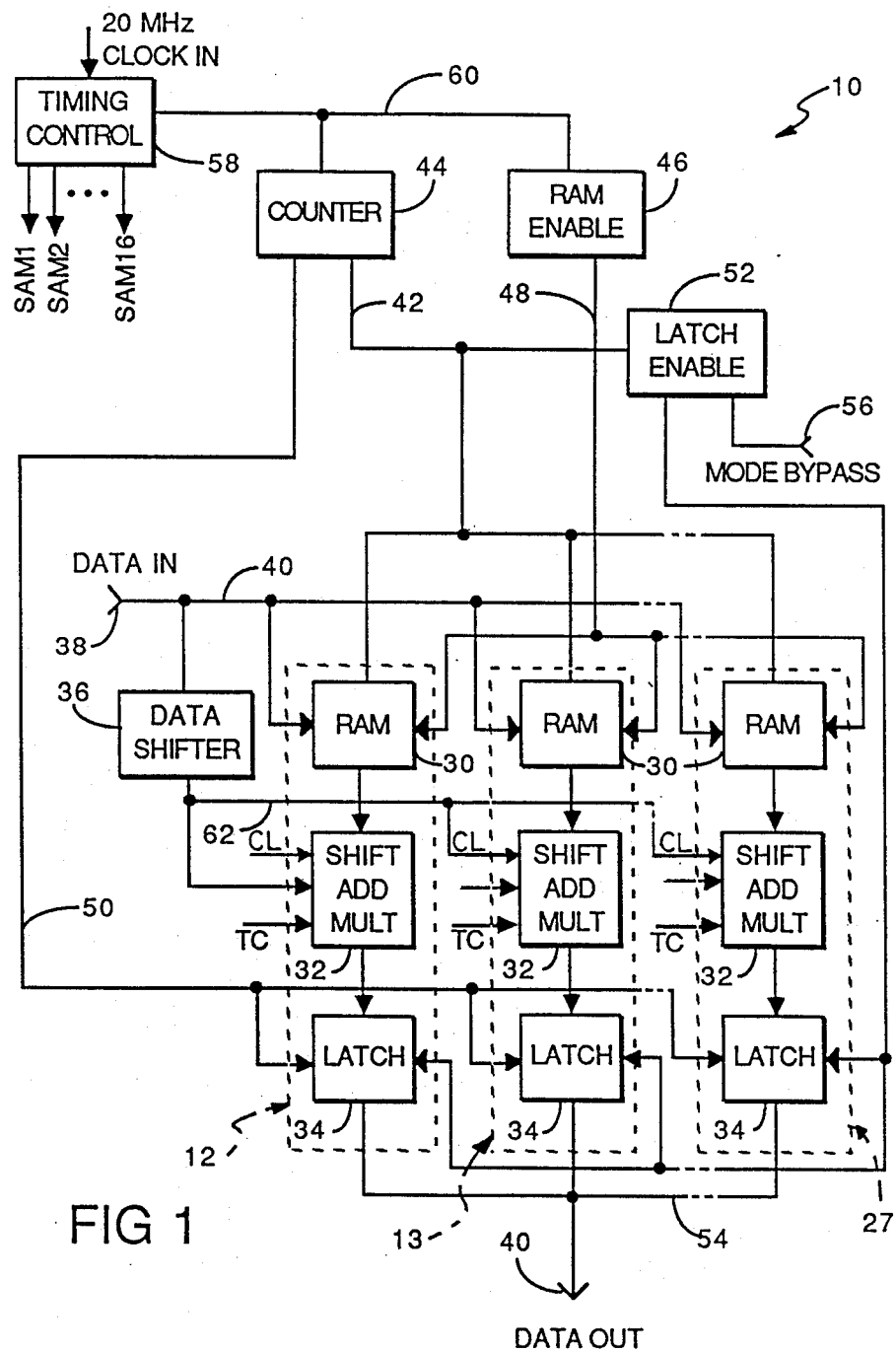
FIG. 1 is a schematic block diagram of the image processing circuit of this invention.

Referring first to FIG. 1, there is shown a schematic block diagram for the image processing circuit 10 of this invention comprising a plurality of sixteen multiplier circuits or cells 12–27 of which only multiplier circuits 12, 13 and 27 are shown. Each of the multiplier circuits 12–27 comprises a random access memory (RAM) 30, a shift-add-multiply (SAM) circuit 32 and a latch 34. Each of the random access memories (RAM) 30 includes a plurality of memory storage zones or areas each capable of storing a different binary formatted coefficient. Each of the RAMS 30 may be selectively enabled to input or output coefficients by control signals received from a RAM enable circuit 46 by way of an interconnecting data line 48. Each memory storage zone or area in which coefficients are stored in each RAM 30 may be selectively addressed to input or output a specific coefficient from the storage area so addressed by control signals received from a counter 44 by way of a data line 42. A timing control circuit 58 responsive to a 20 megahertz clock input pulse provides appropriate timing control signals by way of data line 60 to the counter 44 and the RAM enable circuit 46. The timing control circuit 58 additionally provides appropriate timing control signals to the shift-add-multiply (SAM) circuits 32 by way of input lines TC to control the shift-add-multiply operations in the manner of this invention to be subsequently described herein.

Image data corresponding to select picture elements or pixels of an image are formatted as binary words and received for image processing at a data input terminal 38. The binary formatted image data words are directed by way of a data shifter circuit 36 to simultaneously input all of the shift-add-multiply (SAM) circuits 32 by way of a data line 62 in the manner of this invention to be subsequently described herein. The latch circuits 34 are all controlled to either selectively latch incoming data or bypass incoming data by a latch enable circuit 52 which may operate to switch the latches 34 to operate in a bypass mode in response to an appropriate mode bypass signal applied to an input terminal 56. The timing sequence by which the latches 34 operate to latch incoming data from the shift-add-multiply (SAM) circuits 32 are controlled by timing signals from the counter 44 received by way of a data line 50.

Figure 2:
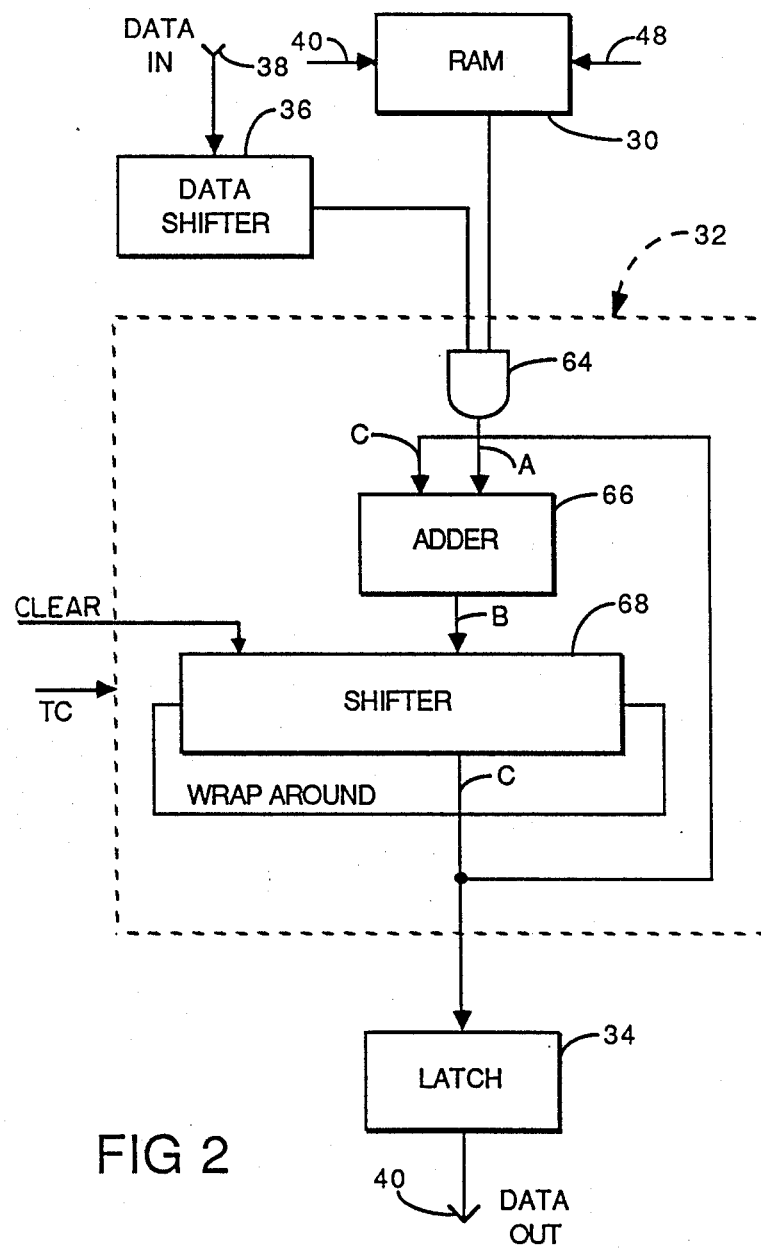
FIG. 2 is a schematic block diagram showing greater detail of a portion of the image processing circuit of FIG. 1.

Referring now to FIG. 2, there is shown a schematic block diagram for one of the multiplier circuits 12–27, wherein the shift-add-multiply (SAM) circuit 32 includes an AND gate 64 having one input terminal connected to receive a select binary encoded coefficient from the RAM 30 and the other input terminal connected to receive a select binary formatted image data word from the data shifter 36. The output from the AND gate 64 is directed, in turn, by a data line A to an adder circuit 66. The adder circuit 66, in turn, provides an output signal by way of a data line B to a shifter circuit 68 which operates in the manner of this invention to be subsequently described to shift the binary bit priority of the input signal. The shifted output signal from the circuit 68, in turn, is directed by way of a data line C back to the adder 66 and to the latch 34 for storage therein as determined by the timing signals from the counter 44. Upon completion of the multiplication operation, binary formatted data is directed out of the latch 34 by way of a data output terminal 40. The shifter 68 may comprise a serial shift register as is well known in the art with a wraparound data line for shifting bits from one side of the register to the other side of the register during the data shift operation in order to maintain the most efficient use of the data storing elements within the register as is well known in the art.

Referring now to FIG. 3 in conjunction with FIGS. 1 and 2, there is shown a tabulated sequence illustrating how image data for a picture element or pixel binary formatted as a four-bit word is multiplied by a coefficient also binary formatted as a four-bit word and stored in the RAM 30. The four-bit binary formatted image data word is shown in row $R_1$ of FIG. 3 and comprises the multiplier while the four-bit binary formatted coefficient is shown in row $R_2$ of FIG. 3 and comprises the multiplicand.

Operation of each of the multiplier circuits 12–27 commences in the following manner. Although each of the multiplier circuits 12–27 operates simultaneously to multiply a different binary formatted coefficient stored in a select memory storage zone or area of its RAM 30 by the selected binary formatted image data word, the operation of only one of the multiplier circuits 12–27 will be described in relation to the tabulated sequence of FIG. 3.

The data shifter circuit 36 operates to transfer the least significant bit of a select binary formatted image data word simultaneously to all the shift-add-multiply (SAM) circuit 32. For the example of FIG. 3 it can be seen that the least significant bit of the select image data word is located in column $C_6$, row $R_1$, and equals 0. All of the data bits of the binary formatted coefficient shown in row $R_2$ are clocked out of the RAM 30 by the counter 44 to the other input terminal of the AND gate 64 during the time that the least significant bit 0 of the select image data word is output from the data shifter 36. Thus, the AND gate 64 effectively operates to multiply the least significant bit 0 of the select image data word by all the data bits of the coefficient to provide an output binary formatted signal on data line A as shown in row $R_3$ of FIG. 3. As is readily apparent, since the multiplier corresponding to the least significant bit of the select image data word is 0, the output binary word from the AND gate 64 comprises all 0 bits. At this initial step, data line C provides no input and thus the binary word inputted to the adder 66 from data line A is simply transmitted without change to output data line B to provide the output binary word as shown in row $R_4$ of FIG. 3. Thus, it can be seen that the binary word output from the adder 66 also comprises all 0 data bits. The data shifter 68, in turn, operates to shift the binary formatted word from data line B by one binary bit to the right to provide a shifted binary output word on data line C as shown in row $R_5$ of FIG. 3. As is readily apparent, the binary word input to the data shifter 68 is comprised of all 0 bits. The latch 34 is controlled by way of timing signals from the counter 44 to latch the binary word outputted from the data shifter 68 on data line C at this time. The binary word outputted from the data shifter 68 is also directed along data line C to input the adder 66 in anticipation of the next multiplication step.

The next multiplication step commences with the data shifter 36 clocking out the next most significant data bit of the select binary formatted data word, which for the example as shown in FIG. 3 comprises a 1 as shown in column $C_5$, row $R_1$. As is readily understood, the binary bit 1 from the data shifter 36 enables the AND gate 64 to pass the entire binary formatted coefficient received from the RAM 30 to provide the output binary formatted signal on data line A as shown in row 6 of FIG. 3. The adder 66 operates to add together the signal's input from data lines A and C; and, since the input signal as previously discussed on data line C is 0, the output signal from the adder 66 on data line C is shown in row 7 of FIG. 3. The signal input to the shifter 68 from data line B is thereafter shifted by one data bit to the right to provide the output signal on data line C as shown in row $R_8$ of FIG. 3. Timing control signals received from the counter 44 by way of data line 50 again enable the latch 34 to latch the output signal from the shifter 68 on data line C. The output signal on data line C is also directed, as previously discussed, back to the adder 66.

The data shifter 36 thereafter clocks out the next most significant data bit of the select image data word, which in our example is a 1 as shown in column $C_4$, row $R_1$ of FIG. 3. Again, the AND gate 64 is enabled by the binary bit 1 from the data shifter 36 to transmit through the binary formatted coefficient from the RAM 30 to provide the output binary word on data line A as shown in row $R_9$ of FIG. 3. The adder 66 operates to add the input binary words on data lines C and A to provide an output binary word on data line B as shown in row $R_{10}$ of FIG. 3. The shifter 68, in turn, operates to shift the input binary word from data line B by one binary bit to the right to provide the output binary word on data line C as shown in row $R_{11}$ of FIG. 3. Again, the latch 34 is controlled by way of timing signals received from the counter 44 to latch the output binary word on data line C from the shifter 68. The data word on line C is also directed as previously described to input the adder 66.

The data shifter thereafter clocks out the next most significant data bit of the select image data word, which in this example happens to be the most significant data bit and equals binary 1 as shown in column $C_3$, row $R_1$ of FIG. 3. Again, the AND gate 64 is enabled by the binary bit 1 received from the data shifter 36 to transmit through all the bits of the binary formatted coefficient received from the RAM 30 to provide on data line A a binary word as shown in row $R_{12}$ of FIG. 3 which corresponds to the coefficient. Adder 66 operates to add the binary words received by way of data lines A and C to provide the output binary word on data line B as shown in row $R_{13}$ of FIG. 3. The shifter 68, in turn, operates to shift the binary word received from data line B by one bit to the right to provide the output data word as shown in row $R_{14}$ of FIG. 3. The latch 34 is controlled by timing signals received from the counter 44 to latch the binary word output from data line C. As is now readily apparent, the binary word stored in the latch 34 corresponds to the result of multiplying the select binary formatted image data word by the binary formatted coefficient. The binary word stored in the latch 34 can then be clocked out in a well-known manner by way of data output terminal 40.

Although, in the aforementioned example, the select binary formatted data word comprised four bits and the binary formatted coefficient comprised four bits, the invention is by no means so limited; and the RAM 48, adder 66, shifter 68 and latch 34 may be selected to operate on any select number of binary bits. Also, since the last binary word outputted from the shifter 68 is representative of the multiplied result between the select image data word and the coefficient, it comprises a significantly higher number of binary bits than either the multiplier or multiplicand. The latch 34 may be configured to discard a select number of the least significant bits so as to maintain the number of bits in the output word generally the same as the number of bits which comprise the image data word and coefficient. Although the above example described the operation of the image processing circuit of this invention for only a single select image data word, it will be readily apparent that in actual operation hundreds of thousands of image data word corresponding to all the pixels of the image will be sequentially processed.

As previously discussed, each RAM 30 is programmed to store a plurality of different coefficients which may be received by way of the data input terminal 38 prior to receipt of the image data words. The counter 44 in conjunction with the RAM enable circuit 48 can operate to clock out any coefficient stored in any of the RAM circuits for each succeeding image data word thereby providing the capability for changing the coefficients by which each successive image data word is multiplied.

Thus, each image data word can be simultaneously multiplied by sixteen different coefficients and the sixteen different coefficients may be changed for each succeeding data word in accordance with timing control signals provided by the timing control 58. Since the coefficients can be changed so readily in this manner, it is possible for the image processing circuit 10 of this invention to simulate both a high pass filter and a low pass filter at the same time by the appropriate selection of coefficients for each half of the multiplier circuits 12-27.

Succeeding image data words multiplied by different coefficients may be added together simply by not providing a clear signal to a clear input terminal to the shifter 68. After each image data word is multiplied by its respective coefficient, the result will be added automatically to the multiplication of the next succeeding image data word by its respective coefficient if the shifter is not cleared. Thus, in this manner image data may be cumulated.

Figure 4:
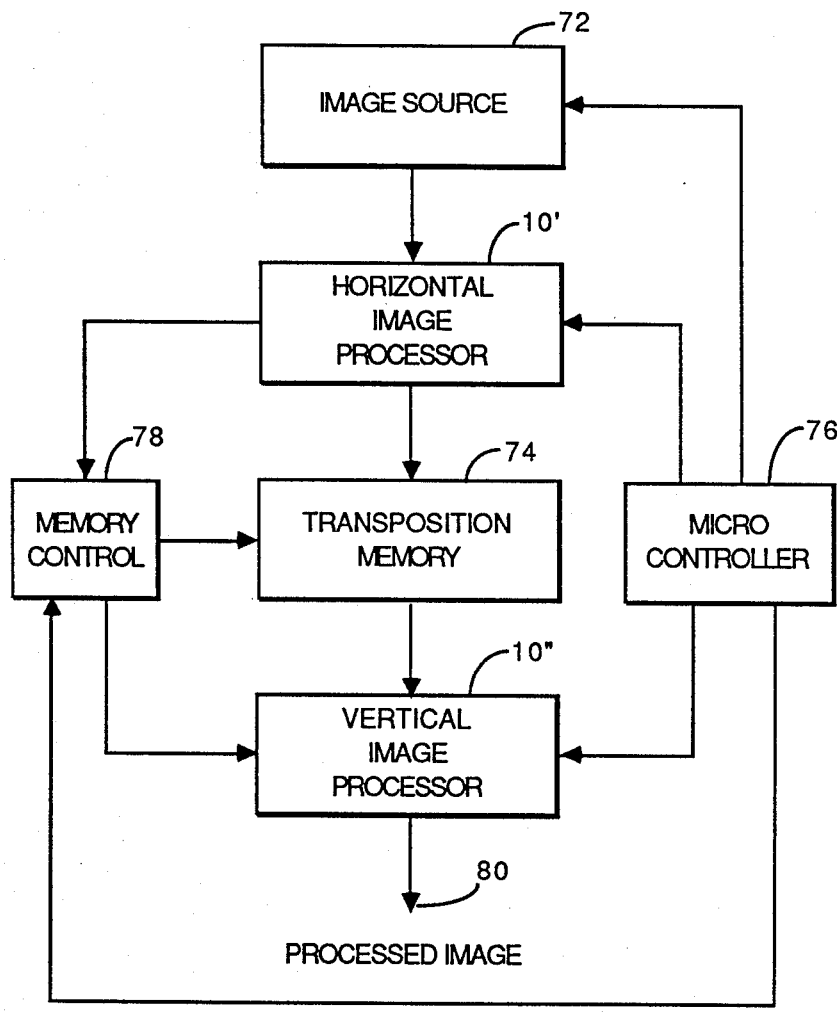
FIG. 4 is a schematic block diagram of a two-dimensional image processing system employing the image processing circuit of FIG. 1.

Since image elements or pixels are generally arranged in a two-dimensional array comprising vertical columns and horizontal rows, it is desirable to conduct such image processing operations in both horizontal and vertical directions. Toward that end there is shown in FIG. 4 an imaging system having a source of image data words as shown at 72 which provides a stream of binary encoded image data words corresponding to each picture element or pixel of a desired image. The image data words are first directed to an image processor circuit 10' of the type shown in FIG. 1 which operates to process the image data words in the aforementioned manner in a horizontal sequence. The output from the image processor 10' is thereafter directed to a transposition memory 74 from which the processed image data words are thereafter directed to a second image processor circuit 10'' of the same type also described in FIG. 1. The image processor 10'' operates to further process the processed image data words in a vertical sequence so as to provide an output signal at terminal 80 indicative of image data words multiplied by select coefficients in both horizontal and vertical sequences corresponding to the horizontal row and vertical column arrangement of the picture elements or pixels which the image data words represent. The appropriate clocking and timing signals are provided as is well known in the art by a microcontroller 76 which operates in conjunction with a memory control circuit 78 for controlling the transposition memory 71.

It will be readily understood that although sixteen parallel multiplier circuits 12-27 have been shown, the invention is by no means so limited and more or less multiplier circuits connected in parallel with respect to each other may be utilized. The parallel connection of the multiplier circuits 12-27 in connection with a single common image data word shifter provides a simple and economical means of performing a large number of different image processing arithmetic operations for each image data word corresponding to a different picture element or pixel of an image.

Other embodiments of the invention including additions, subtractions, deletions and other modifications of the preferred disclosed embodiments of the invention will be obvious to those skilled in the art and are within the scope of the following claims.

What is claimed is:

1. An image processing circuit for simultaneously multiplying a binary formatted image data word corresponding to a select picture element of an image by a plurality of different binary formatted coefficients, said image processing circuit comprising:
   a plurality of multiplier circuits connected in parallel relation with respect to each other, each of said multiplier circuits comprising means for storing at least one different binary formatted coefficient and means for multiplying each bit of a select binary formatted image data word in sequence from the least significant bit to the most significant bit by a select one of the coefficients to provide a binary formatted output signal corresponding to the multiplication of said image data word by said coefficient; and data shifting means for providing the select image data word simultaneously to all said multiplier circuits in timed sequence from the least significant data bit to the most significant data bit wherein each of said multiplier circuits includes: means for latching the binary formatted output signal therefrom, an AND gate having one input connected to receive the binary formatted coefficient from its storing means and the other input connected to receive the binary formated select image data word from said data shifting means, said gate operating to multiply, respectively, each bit of the select binary formatted image data word starting with the least significant bit thereof and ending with the most significant bit thereof by all the bits of the binary formatted coefficient, means for adding the output signal from said AND gate for each multiplication of a bit of the select binary formatted image data word by all the bits of the binary formatted coefficient to a signal corresponding to the multiplication of the immediately preceding bit of the select binary formatted image data word by all the bits of the binary formatted coefficient and providing an output signal corresponding to said addition, and means for shifting the binary bit priority of the output signal from said adding means for each of said multiplication operations and directing the shifted output signal back to said adding means to provide said signal corresponding to the multiplication of the immediately preceding bit of the select binary formatted image data word by all the bits of the binary formatted coefficient, said binary bit priority shifting means also operating to simultaneously provide said binary formatted output signal corresponding to the multiplication of said select image data word by said coefficient for latching by said latching means.

2. The image processing circuit of claim 1 wherein each said shifting means includes means for clearing the data content thereof in response to the receipt of a clear signal, said multiplier circuits operating to cumulate said output signals in the absence of said clear signals.

3. The image processing means of claim 2 wherein each of said storing means comprises a random access memory each structured to store plurality of different ones of said coefficients, said processing means addressing each of said random access memories to retrieve a select one of the plurality of stored coefficients for multiplication by the select image data word.

4. The image processing means of claim 3 wherein said control means also includes means for selectively addressing and enabling said latch means within said multiplier circuits.

5. A method for simultaneously multiplying a binary formatted image data word corresponding to a select picture element of an image by a plurality of different binary formatted coefficients comprising the steps:

storing a plurality of different binary formatted coefficients;

simultaneously multiplying each of the coefficients by each bit of a select binary formatted image data word in sequence from the least significant bit thereof to the most significant bit thereof to provide a binary formatted output for the multiplication of said select binary formatted image data word by each coefficient;

providing the select image data word in timed sequence from the least significant data bit to the most significant data bit for simultaneous multiplication by each coefficient in the preceding step; and latching each of the binary formatted outputs for the multiplication of said select binary formatted image data word by each coefficient wherein the multiplication of each of the coefficient by the select image data word further includes the steps of: imposing the binary AND function to the coefficient and select image data word in a manner operating to multiply, respectively, each bit of the binary formatted select image data word starting with the least significant bit thereof and ending with the most significant bit thereof by all the bits of the binary formatted coefficient; adding the output provided from the imposition of the binary AND function for each multiplication of a bit of the select binary formatted image data word by all the bits of the binary formatted coefficient to an input corresponding to the multiplication of the immediately preceding bit of the select binary formatted image data word by all the bits of the binary formatted coefficient, shifting the binary bit priority of the result from the adding step for each of said multiplication operations and directing said binary shifted result back for addition to provide said input corresponding to the multiplication of the immediately preceding bit of the select binary formatted image data word by all the bits of the binary formatted coefficient.

6. The method of claim 5 wherein said latching step includes the step of selectively latching said binary shifted results to provide, respectively, each binary formatted output for the multiplication of said select binary formatted image data word by each coefficient.

7. The method of claim 6 wherein said step for storing a plurality of different binary formatted coefficients further comprises the step of storing a plurality of different ones of said coefficients in different random access memories and selectively addressing each of the random access memories to retrieve a select one of the plurality of coefficients stored therein for multiplication by the select image data word.

8. The method of claim 7 further including the step of selectively addressing and enabling the latching of selected ones of the binary formatted outputs which represent the multiplication of said select binary formatted image data word by each coefficient.

9. The method of claim 5 further comprising the step of cumulating the multiplication of each succeeding one of said select binary formatted image data word by its respective coefficient.

* * * * *